United States Patent
Dumont et al.

(10) Patent No.: US 7,110,660 B2
(45) Date of Patent: Sep. 19, 2006

(54) VIDEO APPARATUS PROCESS FOR A VIDEO APPARATUS AND VIDEO RECORDER

(75) Inventors: Frank Dumont, Singapore (SG); François Gabrielli, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 667 days.

(21) Appl. No.: 10/128,868

(22) Filed: Apr. 24, 2002

(65) Prior Publication Data

US 2002/0181596 A1    Dec. 5, 2002

(30) Foreign Application Priority Data

Apr. 25, 2001    (EP) .................................. 01401059

(51) Int. Cl.
*H04N 5/94* (2006.01)
*H04N 7/64* (2006.01)

(52) U.S. Cl. ......................... 386/49; 386/114
(58) Field of Classification Search .................. 386/49, 386/51, 76, 77, 100, 113, 114, 115, 116, 2, 386/21, 22, 25, 40

See application file for complete search history.

(56) References Cited

U.S. PATENT DOCUMENTS

| 5,627,599 A | 5/1997 | Hong ......................... 348/643 |
| 5,905,531 A * | 5/1999 | Chiba ......................... 348/241 |

FOREIGN PATENT DOCUMENTS

| GB | 2 099 658 A | 12/1982 |
| WO | 92/22173 | 12/1992 |

* cited by examiner

*Primary Examiner*—Robert Chevalier
(74) *Attorney, Agent, or Firm*—Joseph J. Laks; Robert B. Levy; Jorge Tony Villabon

(57) ABSTRACT

A video apparatus comprises a correction circuit for delaying a luminance stream in a digital stream. The correction circuit has a demultiplexer, a line buffer and a multiplexer to achieve this. This construction enables compensation of the luminance 2H-delay of conventional VHS and S-VHS signals. A process is disclosed for improving the picture quality of conventional VHS and S-VHS signals and for recording the corrected or quality-improved signals.

10 Claims, 3 Drawing Sheets

VIDEO APPARATUS PROCESS FOR A VIDEO APPARATUS AND VIDEO RECORDER

FIELD OF THE INVENTION

The invention relates to a video apparatus, to a process for a video apparatus and to a video recorder.

BACKGROUND OF THE INVENTION

Video sequences to be displayed by video apparatus are coded in a signal according to various possible standards. One of these standards is the VHS standard which is widely-used to record a video signal on a tape.

According to the VHS standard, the luminance signal and the chrominance signal corresponding to a frame of a given number of lines on the display are recorded on a magnetic track of the tape, the luminance signal is frequency modulated in a range between 3.8 MHz and 4.8 MHz and the encoded chrominance signal being amplitude modulated on a 627 kHz carrier. The signals for two successive fields (2 interlaced fields representing 1 picture screen) are recorded on two successive tracks. To reduce cross-talk between the two successive tracks, an azimuth recording method is employed.

This is unfortunately not sufficient to eliminate cross-talk between the low-frequency part of the chrominance signal of two successive tracks. Therefore a complicated phase-shift procedure including a 2H comb-filer (for play-back) had been introduced by the VHS standard in order to eliminate this cross-talk; the chrominance signal consequently lags for a 2-line time behind the corresponding luminance signal. This means that a conventional VHS video processor outputs a chrominance signal which relates to a line originally situated two lines above the luminance signal which is output at the same time. Stated differently, the luminance and corresponding chrominance information are vertically mis-registered. The same problem arises with the S-VHS standard.

In order to correct this inherent defect of the VHS standard, it has been proposed by patent application WO 92/22 173 to provide a video apparatus meant to use the reproduced VHS signal with a CCD-delay-line in order to delay the luminance signal, preferably for a 2H duration. The luminance signal output from the CCD-delay-line thus corresponds to the same line in the originally-recorded video sequence as the chrominance signal output from the comb filter.

Unfortunately, a 2H CCD-delay-line is expensive and has thus scarcely been used for this purpose.

SUMMARY OF THE INVENTION

The invention proposes another solution to correct the defect explained above which is more adapted to circuits used nowadays and which is hence cheap in new environments.

In an inventive arrangement luminance chrominance vertical mis-registration described previously is corrected.

It is proposed a video apparatus with a demultiplexer receiving a first digital stream comprising chrominance information and luminance information and generating a first luminance stream based on the luminance information, a line buffer receiving the first luminance stream and generating a second luminance stream based on the second luminance stream with a delay, and a multiplexer receiving the second luminance stream and able to generate a second digital stream based notably on the second luminance stream.

Preferred embodiments have the following features:
the demultiplexer generates a chrominance stream based on the chrominance information and the multiplexer receives the chrominance stream and generates the second digital stream based on the chrominance stream and the second luminance stream;
the first digital stream is generated by a video decoder from an analogue signal;
a recording circuit is able to record a video signal corresponding to the second digital stream on a medium;
said delay is 2H-long;
said delay can selectively be 2H-long or 4H-long.

The invention also proposes a process for a video apparatus, comprising the steps of:
extracting a first luminance stream from a first digital stream comprising luminance information and chrominance information;
delaying the first luminance stream into a second luminance stream;
gathering chrominance information and the second luminance stream into a second digital stream.

Preferably, the process comprises the further step of recording a video signal corresponding to the second digital stream on a medium and possibly the step of converting an analogue signal into said first digital stream.

Lastly, the invention proposes a video recorder with a correction circuit generating from a received video signal with luminance information and chrominance information a corrected signal with delayed luminance information and with a recording circuit to record the corrected signal on a medium.

BRIEF DESCRIPTION OF THE DRAWINGS

The invention and other features thereof will be better understood in the light of the following description made with reference to the attached drawings wherein.

DETAILED DESCRIPTION OF PREFERED EMBODIMENTS

Figure 1:
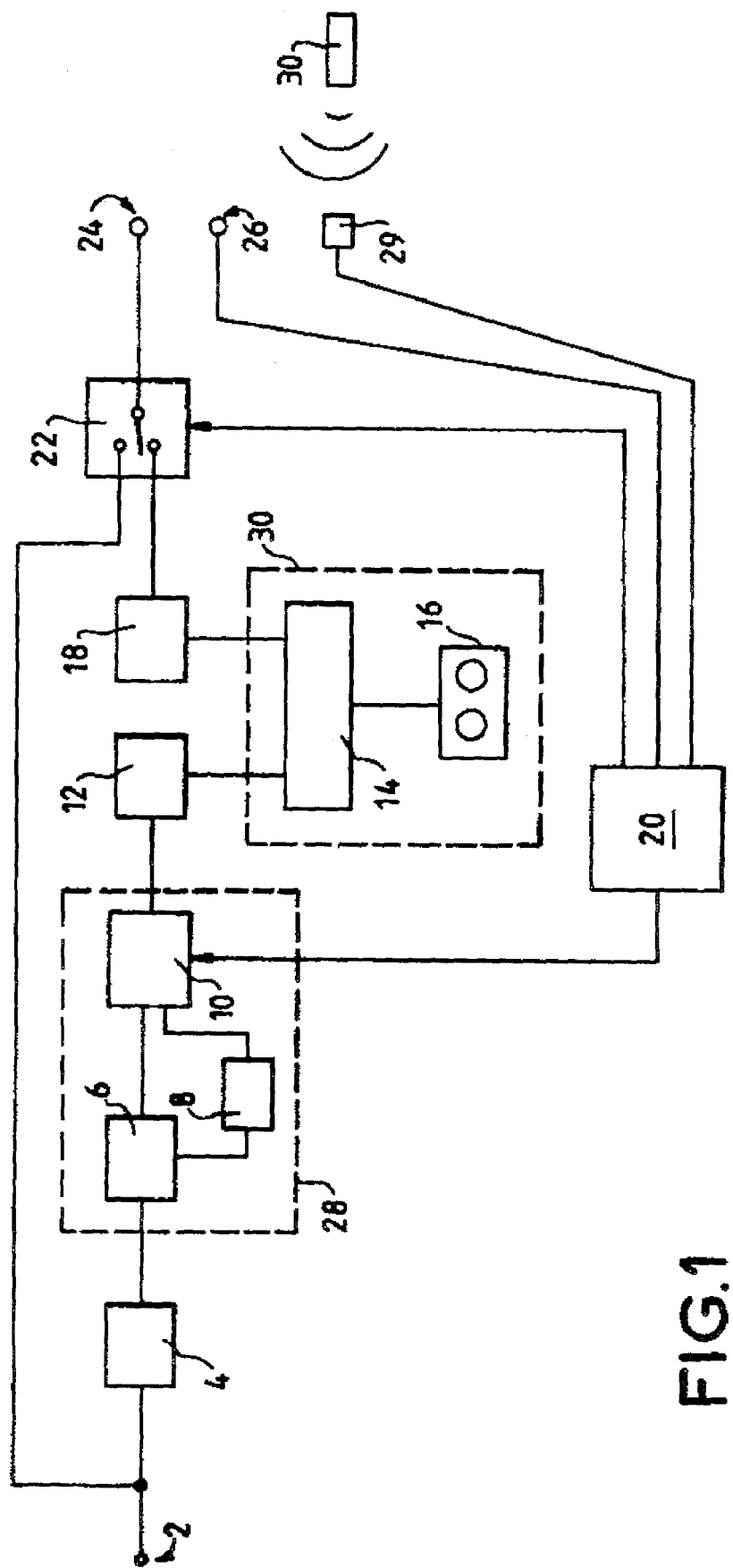
FIG. 1 represents a first embodiment of the invention

A first embodiment of the invention will now be described with reference to FIG. 1 which represents the main elements of a video recorder.

The video recorder has an input connector 2 for receiving a CVBS video signal to be recorded. The input connector is connected on the one hand to a Philips SAA7114 video decoder 4 and on the other hand to a switch 22.

The video decoder 4 receives on its input the CVBS signal, converts the CVBS signal into a digital stream according to the ITU-656 standard (generally referred to as 4:2:2 stream) and outputs the 4:2:2 stream on a 8-bit bus. For conciseness of the drawing, 8-bit buses are represented with a simple line.

The ITU-656 standard provides that the video signal is represented by 8-bit bytes streamed at a frequency of 27 MHz. Out of 8 bytes, each chrominance component U and V is represented on 2 bytes and the 4 remaining bytes are samples of the luminance signal Y. (Hence the name 4:2:2 stream.) For each video line, this represents 1440 samples (1440 bytes) among which 720 luminance samples and 360 samples for each chrominance component.

The 4:2:2 stream from the video decoder 4 is then passed to a demultiplexer 6 which transmits the digital stream to a multiplexer 10 (directly by an internal by-pass) and which also extracts the bytes representing the luminance signal (luminance information) as a first luminance stream on a dedicated bus connected to a line buffer 8.

The line buffer 8 is a FIFO memory, like NEC uPD 485505, which outputs as a second luminance stream the first luminance stream but delayed by two active line periods i.e. 107 µs (each line in 4:2:2 lasting 53, 3 µs).

The second luminance stream output of the line buffer 8 is passed to the multiplexer 10 as well. Under control of a micro-processor 20, the multiplexer 10 can either output the digital stream received from the demultiplexer 6 or output a modified digital stream generated by replacing the luminance bytes in the digital stream from the demultiplexer 6 with the second luminance stream.

The demultiplexer 6, the line buffer 8 and the multiplexer 10 are thus realising a correction circuit 28 which has the ability, under control of the microprocessor 20, to delay the luminance information of a two-line duration in the digital stream received from the video decoder 4 (2H delay).

The digital stream from the correction circuit 28 (i.e. more precisely output from the multiplexer 10) is received by a MPEG encoder 12 (NEC uPD61050) meant to compress the incoming digital stream before transmitting it to a bit-stream processor 14 (Philips SAA6700H) which in turn provides to a recording and reproducing unit 16 a bit stream corresponding to the compressed digital stream which can then be recorded on a medium.

The recording and reproducing unit 16 shown on FIG. 1 is drawn as a cassette which is meant to represent an embodiment where the medium is a tape. In this embodiment, the recording and reproducing unit 16 comprises a drum carrying magnetic heads which record and reproduce a magnetic signal on slanted tracks on the tape, for instance according to the D-VHS standard.

According to possible variations, the recording and reproducing unit 16 could be an optical pick-up reading and writing on an optical disc, or a hard disk drive (HDD) or a flash memory (to record for instance a still picture).

The bit-stream processor 14 and the recording and reproducing unit 16 define a medium interface 30 which is able to read and write a compressed digital stream from and to a medium. As previously described, the compressed digital stream to be written (i.e. recorded) on the medium is generated by a MPEG encoder 12. The compressed digital stream read (i.e. reproduced) from the medium is transmitted to a SGS—Thomson STI5500 combined MPEG decoder and video encoder 18 which outputs to the switch 22 an analogue video signal (CVBS).

The switch 22 is controlled by the micro-processor 20 in order to select which video signal is to be output from the switch 22 to an output connector 24 of the video recorder (generally to be transmitted to a display for viewing). During recording of a video signal incoming on input connector 2, the switch 22 outputs this video signal so that it can be viewed while recording. When reproducing a video signal from the medium, the switch 22 outputs the video signal generated by the combined MPEG decoder and video encoder 18.

The micro-processor 20 is also generating on output lines 26 of the video recorder OSD signals representing images (generally characters) which are meant to be superimposed on the background video sequence represented by the video signal on output connector 24. (OSD stands for On-Screen Display.) These output lines 26 are represented as a single line on FIG. 1 for conciseness but are consisting of three colour signals (R,G,B: red, green, blue) and a fast-blanking signal indicative of when the colour signals have to be superimposed on the background video sequence.

The micro-processor 20 can receive signals from a remote-controller 30 through a remote-control receiver 29. This allows the user of the video recorder to send instructions to the micro-processor 20, for instance through menus transmitted to the display as OSD signals.

Of course, the micro-processor 20 has numerous connections to every part of the video recorder, notably to parts which are represented on FIG. 1. However, each and every connection was not represented to keep FIG. 1 legible for better understanding of the invention.

The way the correction circuit 28 operates (i.e. generating or not a 2H delay) is controlled by the micro-processor 20 through a menu displayed as an OSD. In this goal, the micro-processor 20 is programmed to be able to display as an OSD (on output lines 26) the message: "RECORDING OPTIONS: VHS CORRECTION" followed by the word "ON" when the VHS-correction mode is selected and by "OFF" when the VHS-correction mode is not selected.

The change between the two modes is triggered by the user pressing a key on its remote-control 30. The micro-processor 20 then controls the multiplexer 10 of the correction circuit 28 according to the selection: when in the VHS-correction mode, the multiplexer 10 outputs a digital stream generated by replacing the luminance bytes in the digital stream from the demultiplexer 6 with the second luminance stream from the line buffer 8; when the VHS-correction mode is not selected, the multiplexer 10 outputs the digital stream received from the demultiplexer 6 without any change.

The VHS-correction mode should be used when the CVBS signal received on the input connector 2 is generated from a VHS VCR or when a S-Video signal is received from a S-VHS machine. In this case, the 2H delay of the chrominance signal (present for the reason explained in the introduction of this description) is compensated thanks to the correction circuit 28 and the video sequence is thus identical to the original one.

When the source of CVBS signal is not a VHS (or S-VHS) machine, the VHS-correction should be deselected in order not to introduce a delay in the luminance signal.

Figure 3:
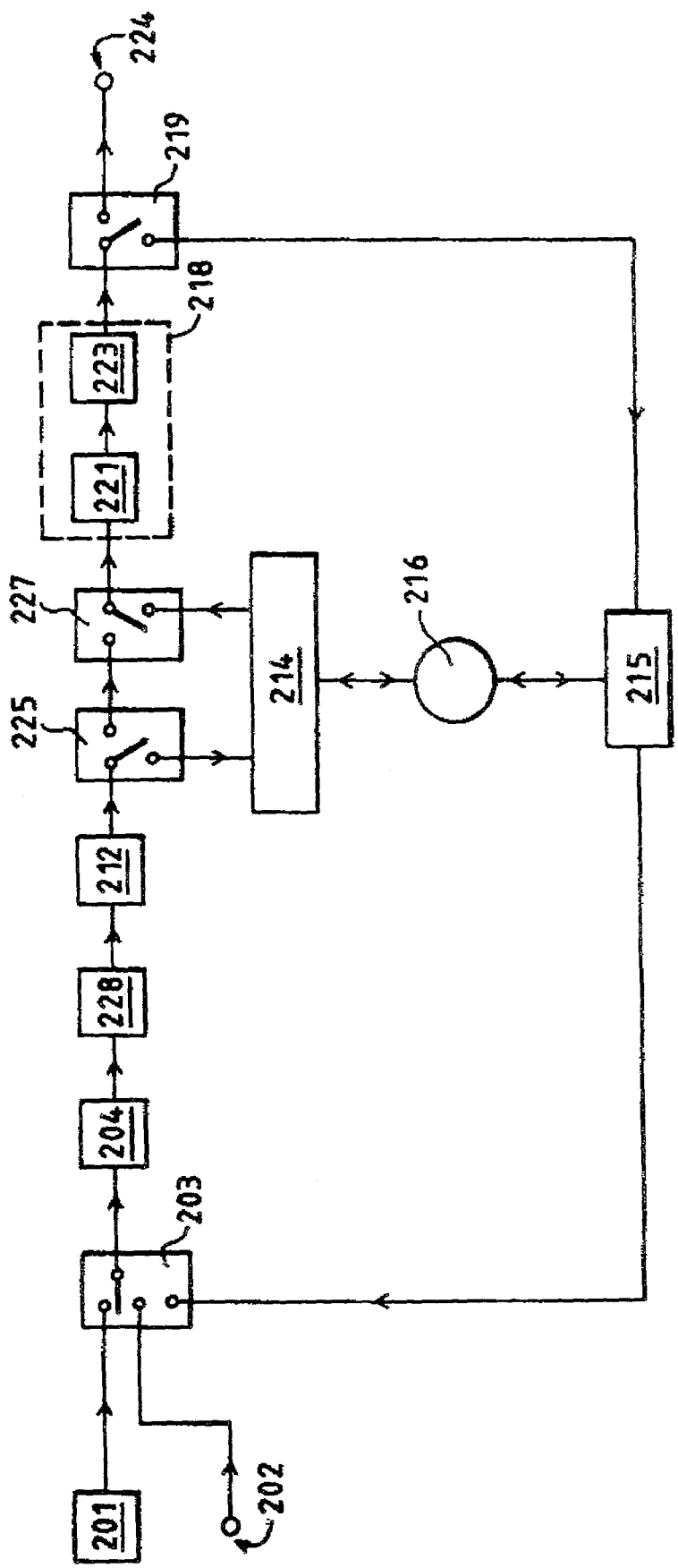
FIG. 3 represents a third embodiment of the invention.

A second embodiment of the invention is represented at FIG. 3 which shows the main elements of a video cassette recorder (VCR) which can record and reproduce tapes according to the VHS standard.

The VCR has an input connector 102 for receiving a CVBS signal. The input connector 102 can be connected to a video decoder 104 by means of a first switch 103.

As described relatively to the first embodiment, the video decoder 104 receiving a CVBS signal outputs a corresponding 4:2:2 digital stream according to the ITU-656 standard.

The 4:2:2 digital stream from the video decoder 104 then passes through a correction circuit 128 which can create a 2-line delay (2H delay), a 4-line delay (4H delay) or no delay in the luminance information (bytes of the 4:2:2 digital stream representing luminance), depending on commands from a micro-processor. The correction circuit 128 of the present embodiment and the correction circuit 28 of the first embodiment are identical, except that it contains a second FIFO line buffer which is serially connected to the first line buffer in the 4H delay mode.

The 4:2:2 digital stream output from the correction circuit 128 is then coded back to a CVBS signal by a video encoder 118 and transmitted to a VHS processing unit 114 through a second switch 119. The CVBS signal can thus be recorded on a tape according to the VHS standard by a drum unit 116 receiving the signal from the VHS processing unit 114.

The VCR with such construction can operate according to 3 possible modes:

- a normal mode, without chrominance-delay correction, where the correction circuit 128 generates no delay in the incoming 4:2:2 digital stream;
- a 2H-delay mode, where the correction circuit 128 generates a delay of the duration of two lines for the luminance information and which can be used for instance to record a CVBS signal coming from another VCR reproducing a VHS tape (this last signal having a chrominance delayed of 2 lines compared to the luminance) or to record an original CVBS signal (without any chrominance delay), for instance from a tuner, as a "pre-corrected" VHS tape;
- a 4H-delay mode, where the correction circuit 128 generates a delay of the duration of four lines for the luminance information and which can be used to record a CVBS signal reproduced from a VHS tape in another VCR as a "pre-corrected" VHS tape.

A "pre-corrected" VHS tape is a new concept introduced by this invention which means that the luminance information is recorded on the tape with a 2-line delay compared to the original video sequence. This luminance delay is then compensated by the conventional chrominance delay generated when a VHS signal is reproduced. A "pre-corrected" VHS tape reproduced by a conventional VCR would thus show no delay between luminance and chrominance compared to the original video sequence.

The information that a given tape is "pre-corrected" can be recorded on the tape in the vertical blanking interval (VBI) according to the close-caption format.

The VCR can naturally also reproduce VHS tapes: the drum unit 116 and the VHS processing unit 114 output a CVBS signal to the first switch 103. As explained in the introduction of the present description, the VHS processing unit 114 generates a 2-line delay in the CVBS signal output to the first switch 103 compared to the video sequence recorded on the tape.

The first switch 103 then connects the output of the VHS processing unit 114 to the input of the video decoder 104 in order to convert the CVBS signal reproduced from the tape into a 4:2:2 digital stream. The 4:2:2 digital stream is then passed through the correction circuit 128 (which can theoretically work according to any of the three modes described above) to the video encoder 118 which converts it back to a CVBS signal transmitted to an output connector 124 via the second switch 119.

Generally, only two modes are used during reproduction of a tape the normal mode can be used for instance when a "pre-corrected" VHS tape is reproduced as the luminance information and chrominance information have no delay between each other at the output of the VHS processing unit (as explained above); the 2H-delay mode can be used when reproducing a VHS tape, which was previously conventionally recorded, in order to remove the 2H chrominance delay, as explained relatively to the first embodiment.

As can be noted from above, the first connector 103 is controlled by the micro-processor to connect the input connector 102 to the video decoder 104 during recording and to connect the output of the VHS processing unit 114 to the video decoder 104 during reproduction (also called play-back).

The second connector 119 is controlled by the micro-processor to connect the output of the video encoder 118 to the input of the VHS processing unit 114 during recording and to connect the output of the video encoder 118 to the output connector 124 during play-back.

A third embodiment of the invention is represented at FIG. 3: the invention is implemented in a VCR capable of recording and reproducing according to both the VHS and D-VHS standards.

The VCR has an input connector 202 for receiving a CVBS signal and a front-end circuit 201 (including a tuner and demodulation circuit). It should be noted that such a front-end circuit was not mentioned in the previous embodiments but that the video apparatus of the invention can naturally comprise a front-end circuit as a further source of CVBS signal.

The VCR comprises a VHS processing unit 215 which is able to output a CVBS signal reproduced from a VHS tape read by a drum unit 216.

A first analogue switch 203 has 3 inputs for receiving a CVBS signal, respectively from the front-end circuit 201, from the input connector 202 or from the VHS processing unit 215. The input selected in the first analogue switch 203 is output to a video decoder 204 which converts the selected CVBS signal into a 4:2:2 digital stream and transmits it to a correction circuit 228.

The correction circuit 228 is identical to the correction circuit 128 of the second embodiment. The 4:2:2 digital stream output from the correction circuit 128 can thus be the same as received, or have luminance bytes delayed by a 2- or 4-line duration compared to the received stream.

The 8-bit output bus of the correction circuit 228 is in turn connected to a MPEG encoder 212 which generates a MPEG stream to be received by a bit-stream processor 214 through a first digital switch 225. The bit-stream processor 214 cooperates with the drum unit 216 to record the MPEG stream on a tape according to the D-VHS standard.

The bit-stream processor 214 has also an output bus connected to a MPEG decoder part 221 of a combined MPEG decoder—video encoder 218 through a second digital switch 227. The video encoder part 223 of the combined MPEG decoder—video encoder 218 is connected to a second analogue switch 219 which allows CVBS signals from the video encoder 223 to be transmitted to an output connector 224 or to the input of the VHS processing unit.

Lastly, the first digital switch 225 has a further output connected to a further input of the second digital switch 227.

When the first digital switch 225 connects the MPEG decoder 212 to the bit-stream processor 214 and the second digital switch 227 connects the bit-stream processor 214 to the combined MPEG decoder—video encoder 218, the video recorder operates exactly as described relatively to the first embodiment. The first analogue switch 203 can then select the CVBS signal from the front-end circuit 201 or the input connector 202 (but not from the VHS processing unit 215 as the drum unit 216 is already used for D-VHS recording or play-back); the second analogue signal 219 connects the output of the combined MPEG decoder—video encoder 218 to the output connector 224.

When the first digital switch 225 connects the MPEG decoder 212 to the second digital switch 227 and the second digital switch 227 connects the first digital switch 225 to the combined MPEG decoder—video encoder 218 (the MPEG decoder 212 being thus connected to the MPEG encoder part 221), the video recorder operates exactly as described in the description of the second embodiment.

As a possible variation, the MPEG encoder 212 can be moved between the first digital switch 225 and the bit-stream processor 214 and the MPEG decoder part 221 can be moved between the bit-stream processor 214 and the second digital switch 225. In this variation, the first and second digital switches 225, 227 carry 4:2:2 digital streams (instead of MPEG streams) but the operating principles remain the same.

Figure 2:
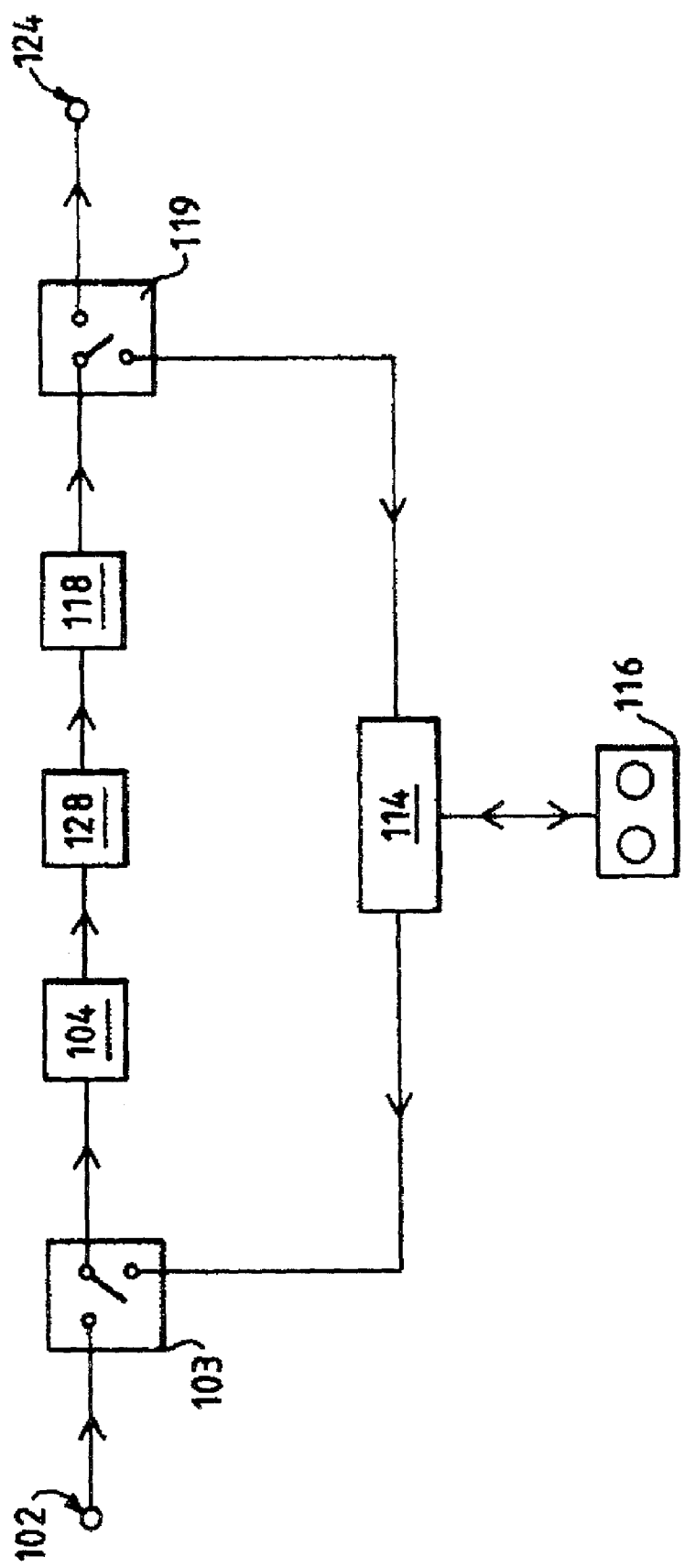
FIG. 2 represents a second embodiment of the invention

It should be noted that some parts of the second and third embodiment which are not relevant to the invention have been omitted for clarity. For instance, the switch 22 (FIG. 1) allowing to view a video sequence while recording was not represented on FIGS. 2 and 3. The same feature can of course also be implemented in the second and third embodiment.

Although the above description has been made with reference to VHS and CVBS standards, it also applies to S-VHS and S-Video standards as the various video encoders and video decoders mentioned above can also cope with this last standard.

What is claimed is:

1. A video apparatus comprising:
    a demultiplexer receiving a first digital stream comprising chrominance information and luminance information and generating a first luminance stream based on the luminance information;
    a line buffer receiving the first luminance stream and generating a second luminance stream based on the first luminance stream with a delay; and,
    a multiplexer receiving the second luminance stream and generating a second digital stream based on the second luminance stream and the unchanged chrominance information of the first digital stream.

2. A video apparatus according to claim 1, wherein the demultiplexer generates a chrominance stream based on the chrominance information and in that the multiplexer receives the chrominance stream and generates the second digital stream based on the chrominance stream and the second luminance stream.

3. A video apparatus according to claim 1, wherein the first digital stream is generated by a video decoder from an analogue signal.

4. A video apparatus according to claim 1, wherein a recording circuit is able to record a video signal corresponding to the second digital stream on a medium.

5. A video apparatus according to claim 1, wherein said delay is 2H-long.

6. A video apparatus according to claim 1, wherein said delay can selectively be 2H-long or 4H-long.

7. A process for a video apparatus, comprising the steps of:
    demultiplexing a first digital stream comprising luminance information and chrominance information for extracting a first luminance stream from said digital stream;
    delaying the first luminance stream to form a second luminance stream; and
    combining the unchanged chrominance information of the first digital stream and the second luminance stream to form a second digital stream.

8. A process according to claim 7, further comprising the step of:
    recording a video signal corresponding to the second digital stream on a medium.

9. A process according to claim 7, further comprising the step of:
    converting an analogue signal into said first digital stream.

10. A video recorder comprising:
    a correction circuit generating from a received video signal with luminance information and chrominance information a corrected signal with delayed luminance information; and
    a recording circuit to record the corrected signal on a medium;
    wherein said correction circuit includes at least a demultiplexer for receiving said video signal and generating a luminance stream based on the luminance information and a line buffer for receiving the luminance stream and generating a second delayed luminance stream based on the delayed luminance information such that the second luminance stream and the unchanged chrominance information can be combined to generate a second video signal.

* * * * *